Oct. 27, 1931.  E. A. ANHEUSER  1,829,385
FILE CUTTING APPARATUS AND METHOD OF MAKING FILES
Filed April 25, 1927  2 Sheets-Sheet 1
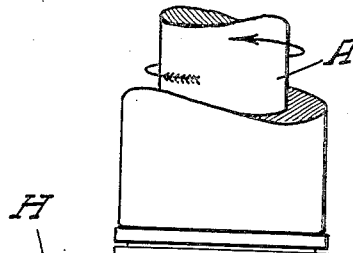
Fig. 1.
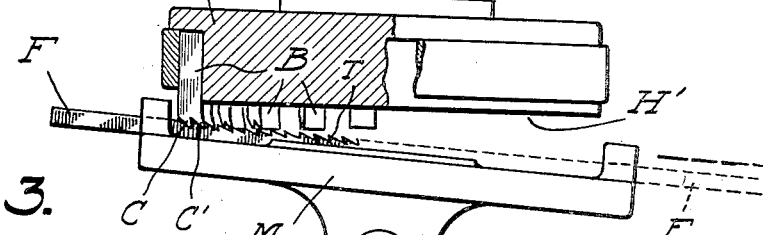
Fig. 3.  Fig. 4.
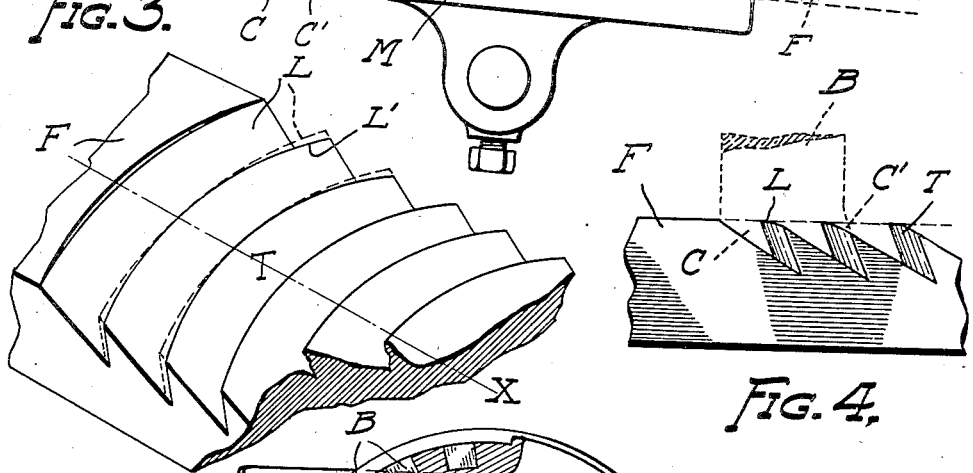
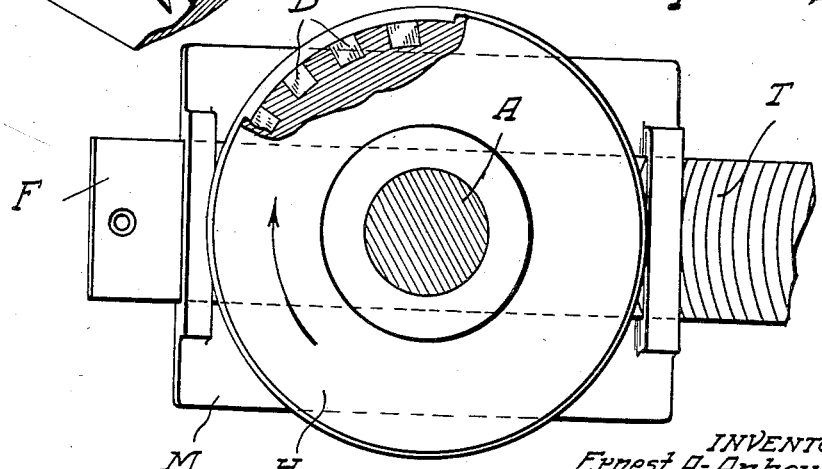
Fig. 2.
WITNESS:
Betty Kron
INVENTOR:
Ernest A. Anheuser
BY:
ATTORNEY.

Oct. 27, 1931.   E. A. ANHEUSER   1,829,385
FILE CUTTING APPARATUS AND METHOD OF MAKING FILES
Filed April 25, 1927   2 Sheets-Sheet 2
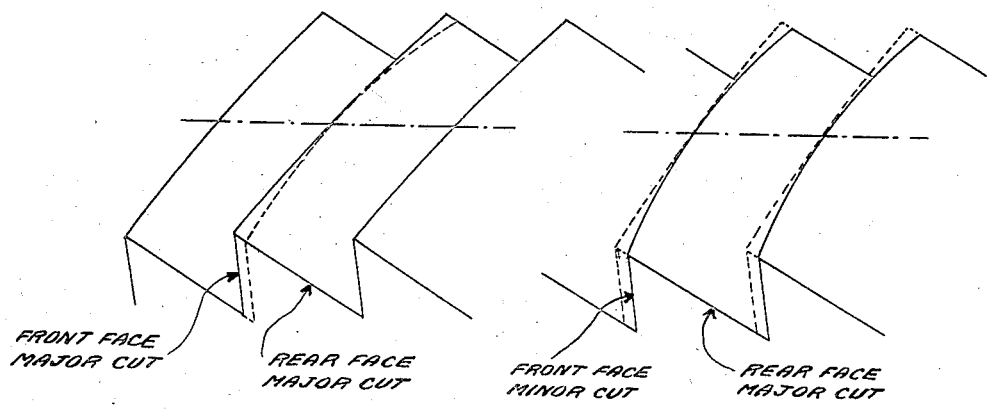
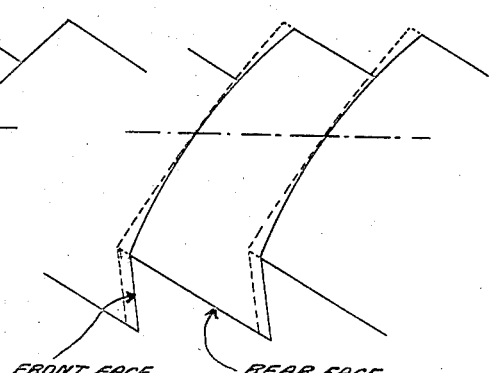
INVENTOR
ERNEST A. ANHEUSER
BY
ATTORNEY Patented Oct. 27, 1931

1,829,385

UNITED STATES PATENT OFFICE

ERNEST A. ANHEUSER, OF MILWAUKEE, WISCONSIN, ASSIGNOR TO HELLER BROTHERS COMPANY, OF NEWCOMERSTOWN, OHIO, A CORPORATION OF OHIO

FILE CUTTING APPARATUS AND METHOD OF MAKING FILES

Application filed April 25, 1927. Serial No. 186,477.

This invention is related to the art of making files, rasps, or the like; used as tools for the purposes of planing, or, smoothing surfaces that receive an ultimate finish which offers regular planes and flowing contours, such as are requisite in structures of the autobody and relatively similar creations.

The several objects of the invention are concerned with the formation of teeth convexly formed upon a rectangular bar, in laterally disposed relationship, and arcuately parallel; the resulting formation being applicable to both sides of a flat bar, but generally, confined to one surface, the bar being attachable to an auxiliary member, serving as both, a curve-inducing base, and an operative handle means. The obtaining of convex teeth upon a flat surface by means of a rotating dual cutter disposed to revolve in a plane that is acutely oblique to the surface of the surface upon which the teeth are cut. The providing of a tool-head that offers a dual arrangement of cutting teeth, concentrically related. The obtaining of a dual cutter that provides an initial tooth formation with cutters arranged about a major circle and a partial change in said formation with cutters disposed around a minor circle or, vice versa. The providing of means whereby two teeth are cut in one revolution concavely on the flat bar, and recut in a consecutive revolution to render one of said teeth convex and complete; the process being repeated thereafter. The obtaining of a cutter-head for supporting dually arranged concentric cutting bits upon a major and minor radii offering an incomplete circle of bits to provide a blank space on the cutter-head beneath which a worked bar can be moved for getting the pitch separation of whatever variety of tooth formation desired.

Other features may be remarked in the detailed description and pointed out in the claims here appended.

The description refers to drawings showing the various aspects of the mechanical assembly and the effects here considered. The several views being designated, as:

Fig. 1 is a side elevation of the cutter head assembly, as applied to the work of file-cutting.

Fig. 2 is a plan view of Fig. 1

Fig. 3 is an enlarged fragmentary view to show the cutting effects.

Fig. 4 is a detail side view of a cut bar with the cutting-bits indicated in dotted line.

Figs. 5 to 8 are detailed views illustrating, to an exaggerated degree, the cutting action resulting in the improved file of transversely convex section and of which:—

Figs. 5 and 6 are respectively, a partial perspective view and a view in transverse cross-section of the file teeth as initially contoured by the cutter of major radial position and Figs. 7 and 8 are similar perspective and transverse sectional views of the finished teeth as modified by the action of the cutter of minor radial position.

Similar reference characters apply to like parts throughout the several views.

A circular cutter-head H, mounted in a suitable machine for rotating same, is provided with cutting tools B fixed about its circumferential edge for a portion of the circle in order to leave a vacant gap H'. The bits B are fashioned to offer two rows of cutters C and C' that will lie in circles which offer, respectively major and minor radii from the center of the rotating shaft A. Beneath the head H is located a table M that may be tilted to offer a slanting platform with respect to the aforesaid head, and in which position same is used in the present instance. Blank stock F, of the strap-like steel variety, is fed across the table M in the direction indicated by the arrow, but the feeding direction may be from the opposite side, the cutting effect upon the steel resulting in a desired finality. Also, the stock may be fed as a continuous product, or, in lengths previously determined and perforated at suitable points for attaching the finished articles to operating handles, such as are seen in the inventor's pending application Serial No. 159,305, filed Jan. 6th, 1927, for a similar means.

In the present instance a concave cutting means is employed for attaining a convex tooth formation T upon an originally flat bar, by arranging the cutting bits C' to reduce those portions, of a concavely formed tooth L, lying at either side of the medial line X of the bar F, and to make the said reductions so that the said tooth L, or, initial cut made by the bit C, will be changed by the cutting effect of the bit C' rotating in the path L', to produce a reshaping that is a gradual departure from the radius of L to the radius of L' symmetrically occurring at either side of the medial line X where the transformation is zero. This changing process is considered in accordance with the feeding direction indicated by the arrows shown. Of course the initial cut made by C' in beginning a new blank would not be changed, but every succeeding L-tooth thereafter would be recut. The final result would be the same, were the feed in the opposite direction, which would give an initial cut with the bit C' and a finishing cut with C. The result of employing cutters, as here arranged, reduces the tooth formations so as to convert a concave aspect into a very desirable convex shape of tooth whose center at the medial line, through having not been disturbed, is the high-point, with a gradual decline along the arcuate crest that increases with the distance either side of said line.

The improved cutting action resulting in the production of a curved tooth file of transversely convex form will be more readily understood by reference to Figs. 5 to 8 wherein Figs. 5 and 6 illustrate, to an exaggerated degree, the initial form of the file tooth as generated by the cutter of major radius. This initial form would result from the action of the cutter C with the feed of the blank in the direction reversely of the arrow in Fig. 3 and it will be noted that both the front and rear faces of the file tooth are formed or contoured by the major radius cutter and in consequence the file tooth in this initial form is of concave transverse section as shown in Fig. 6.

The completing or reshaping of the file tooth by the subsequent action of the cutter C' of minor radial position is shown in full lines in Figs. 7 and 8 (and by dotted lines in Fig. 5). As will be noted, the cutting action of the minor radius cutter C' will cut back the lateral portions of the front face of the file tooth to a degree progressively increasing toward the sides of the file blank by reason of the lesser radius of the cutter. This results in the completed file tooth of transversely convex form as shown in Figs. 7 and 8. The improved cutting operation accordingly consists in the completing of the file teeth by forming the front face of the file tooth (or lateral portions thereof) by a finishing cut of a cutter in the minor or inner radial position and forming the outer or rear face of the file tooth by a finishing cut of a cutter in major or outer radial position. The term "finishing cut" as thus applied to the cutting of the faces referring to the finishing or contouring of said faces rather than to the time order of their action in the cutting operation, the latter being reversible in accordance with the direction of feed.

The attaining of a desired result in the fashion here considered, eliminates certain intricacies of machine construction, whereby novel means is requisite to prevent a cutting effect upon the bar stock, when said stock is disposed beneath cutting tools at an angle opposite to what is here assumed; the latter condition leaving a necessary gap H' through which the bar F may be stepped forward readily without supplying any mechanical means for lifting the cutters; although, at times and with certain classes of work, the opposite angle has its particular uses.

The cutters B are dual edged to offer points C and C' equal to the "pitch" and shape of the file teeth desired, and these may be variable in keeping with the particular fineness or coarseness of the file surfaces desired. The cutters are shown as units but these may be separate bits as well, or, the complement may be all in one piece, attachable to the head H. The said cutters occupy approximately one-half of the head's circumferential area, leaving the other half H' free of projecting cutters in order to provide the gap before referred to. The cutters are arranged to project from the head in increasing relationship that will produce one complete tooth and one advancing step of the blank F, for each revolution of the head H. The radius of the bit complement C is the major radius, and in shaping the initial cut, due to the head's incline, produces a concavity that is of less extent than the lesser radius of C', which latter, when superposed upon the tooth L imposes its greatest concaving effect at the outer portions of the said tooth L, while leaving the center unscathed because of the tangency between the paths L and L' at the medial center of the blank F. The variation in the cuts made by the bits C and C' are illustrated in Fig. 3, while the depth of concavity attained by the two bits is shown as same affects the side of the blank aforesaid.

The Figs. 3 and 4 are magnified beyond scale for the purposes seen; the actual variations from a flat bar surface are slight, but the differences here of 3 or 4 thousandths are to be understood as appreciable amounts, and that 7 or 8 thousandths would be an amount considered excessive in tools of this class. (Factors of an inch are meant.)

The concentric arrangement of the cutting means here used, is for practically, a going over of the work already done by one bit, with another bit, for getting a finished tooth formation; in contradistinction to a use of concentric cutters for getting a tooth formation of compound profile, with a tool presenting the opposite outline to the profile aforesaid.

The manner of mounting the cutters in the head has not been considered here, there being standard methods for affairs of this kind, any one of which being equally serviceable in this instance, where no complicated structure, differing from tool-holding practice, occurs.

Having described the invention what applicant claims, is:

1. A file cutting apparatus having in combination a circular rotating cutter head, cutting bits forming pairs of cutting teeth disposed about a part of the circumference of said head to provide projecting inner and outer concentric rows of cutting teeth, a work support adapted to receive a bar file blank disposed beneath and inclined to said head.

2. A file cutting apparatus comprising a rotatable milling head provided with cutters disposed at major and minor radii and a work support adapted to support a blank in operating relation thereto, said cutters in the minor radial position being formed and positioned to finish the front face of the generated tooth and said cutters in the major radial position being formed and positioned to finish the rear face of the generated tooth, thereby to obtain a finished tooth of convex curvature transversely of the blank.

3. A file cutting apparatus comprising a rotatable milling head provided with cutters disposed at major and minor radii and means for supporting a blank in acute angular relation to the head, said cutters in the minor radial position being operative to finish at least a portion of the front face of a generated tooth and said cutters in the major radial position being operative to finish the rear face of a generated tooth thereby to obtain a finished tooth of convex curvature transversely of the blank.

4. A file cutting apparatus comprising a rotatable milling head provided with cutters disposed at major and minor radii and means for supporting a blank for feed movement substantially radial to the axis of rotation of the head, said cutters in the minor radius being operatively positioned for finishing the lateral portions of the front face of a generated tooth and said cutters in the major radial position being operatively positioned to finish the rear face of a generated tooth thereby to obtain a finished tooth of convex curvature transversely of the blank.

5. The herein described method of forming a curved tooth file which consists in forming the outer face of the file tooth by a finishing cut of a cutter operating in a circular path and forming at least the lateral portions of the front face of the file tooth by a finishing cut of a cutter operating in a circular path of relatively smaller radius to produce a finished tooth of convex curvature transversely of the blank.

In testimony of which I hereby affix my signature.

ERNEST A. ANHEUSER.